June 7, 1966 W. W. CHAMBERS 3,254,838
TEMPERATURE CONTROL ARRANGEMENTS
Filed Sept. 17, 1962 3 Sheets-Sheet 1

INVENTOR.
WILLIAM W. CHAMBERS
BY
ATTORNEYS

WILLIAM W. CHAMBERS
INVENTOR.

BY Fraser and Bogucki

ATTORNEYS

June 7, 1966 W. W. CHAMBERS 3,254,838
TEMPERATURE CONTROL ARRANGEMENTS
Filed Sept. 17, 1962 3 Sheets-Sheet 3

WILLIAM W. CHAMBERS
INVENTOR.

BY
ATTORNEYS

3,254,838
TEMPERATURE CONTROL ARRANGEMENTS
William W. Chambers, Anaheim, Calif., assignor to Robertshaw Controls Company, Anaheim, Calif.
Filed Sept. 17, 1962, Ser. No. 223,984
1 Claim. (Cl. 236—68)

This invention relates to temperature control circuits, and more particularly to thermostatic type temperature control circuits used in conjunction with heating or cooling units to maintain a preselected temperature in a particular space.

Various types of temperature control circuits have heretofore been proposed. One of the more widely used is the thermostat "on-off" type wherein a heating or cooling unit is switched to either full "on" or full "off" operation by the action of a thermostatic switch. The thermostatic switch (usually of the bimetallic type) is internally located to be closed or opened by the effect of the ambient temperature within the space. The closing of the contacts of the thermostatic switch may be utilized to turn the heating or cooling unit either on or off, depending upon the particular control desired.

This simple combination of a thermostatic switch coupling a heater or refrigerator unit to its power source provides fairly good temperature regulation with a minimum of complexity and cost. However, these prior control systems are not able to provide the degree of regulation desired in many instances. The discontinuous step-by-step or "on-off" control of the type described in most cases produces wide fluctuations about the preselected mean temperature within the space. The practical effects of the fluctuations are in many cases not only undesirable but intolerable, depending upon the nature of the temperature control problem. With room temperature control, the fluctuations might only produce mild discomfort; whereas, such temperature changes might be intolerable in a baking oven.

Both the fluctuations themselves and their effects become more pronounced where the difference between the temperature of a hot or cold surge from the heater or cooling unit and the preselected temperature becomes greater. For example, the heating element of an oven may produce very high temperatures in the immediate vicinity of the element as compared with the average temperature maintained throughout the oven. If operation of the heating element causes rapid changes in oven temperature, a delay in stopping the operation results in an overshoot of oven temperatures above the preselected temperature. This overshoot effect will be less as the preselected temperature approaches the temperatures generated by the heating element.

Temperature regulation for cooking ovens presents other problems not usually encountered in other fields. When the ovens are used to cook food at lower temperatures, the temperature variations are not only slightly greater than at higher temperatures but also tend to have a serious effect upon the outcome of the dish prepared since, as a general rule, foods cooked at lower temperatures are more sensitive to temperature variations. Further, if the bimetallic or other thermostatic switch is located within the oven itself, the switch contacts and other elements are subjected to the adverse effects of high temperatures as well as any dirt and vapors therein.

It has heretofore been proposed to utilize separate temperature sensing devices placed within the oven itself while removing the actual switching circuitry outside, away from the high temperatures, dirt and vapors. One such method places a thermistor element having a known temperature coefficient of resistance within the oven space. Changes in the resistance value of the thermistor are then sensed by externally located electronic circuits, and an electrical signal of sufficient power is produced to switch the heat unit off and on at the correct temperatures. However, the additional cost of signal amplifiers and various other electronic circuits necessary to this scheme are not always justified economically. Even then, there still remain the problems of temperature fluctuations from the "on-off" operation.

Furthermore, in residential heating and cooling systems, for example, it is desirable to maintain a controlled temperature as even as possible because a substantial number of people are sensitive to variations of indoor temperature over a range of only a few degrees. Most such systems employ mechanical or electromechanical sensing and control elements which are insufficiently sensitive to temperature changes and which are subject to wear and deterioration in use. On the other hand, such electronic temperature sensing and control arrangements as are known are substantially more complex and, while they may provide greater sensitivity than the mechanical or electromechanical counterparts, the increased complexity makes the cost excessive and militates against reliability in operation over extended periods.

With the recent increase in the use of central air conditioning systems for residences, most of which depend upon the air circulating portion of the central heating system, the complexity of the temperature sensing and control circuitry is further complicated by the duplication of such circuitry for both heating and cooling systems. In such combined systems or in any application where there is a need to maintain a constant preselected temperature, regardless of whether the outside environment temperature is higher or lower, it is desirable to provide a relatively simple temperatrue control circuit which is capable of controlling both heating and cooling systems to maintain a preselected temperature with reliability and to a high degree of accuracy.

As a practical matter, electronic temperature control circuits should not only be constructed at a minimum cost, but should also be efficient in operation. Prior temperature sensing circuits have employed electronic elements, such as electron tube amplifiers, consuming considerable amounts of power during the entire period of their operation. As a result, the operating cost of such temperature control circuits is raised considerably by undue power consumption, maintenance and replacement costs. In attempting to circumvent these problems by employing low cost, low power elements it is desirable to avoid increasing the number of elements or decreasing system sensitivity.

Therefore, it is an object of this invention to provide an accurate temperature control circuit for maintaining a preselected temperature, which requires a minimum number of electronic elements and electrical contacts.

More specifically, it is an object of this invention to provide an improved temperature control circuit for ovens and the like wherein the switching elements may be located external to the oven space.

A further object of this invention is to provide a temperature control circuit for maintaining a preselected temperature within an oven by on-off operation wherein the temperature variation around the preselected temperature is held to a minimum.

A further object of this invention is to provide a temperature control circuit which may be adapted for use in maintaining desired temperatures in oven, refrigerators, homes and the like utilizing a temperature responsive resistance wherein the power consumed by the control circuit is minimized.

Another object of this invention is to provide an economical temperature control circuit which may be used for controlling heating or cooling units operated by gas or electricity.

A still further object of the invention is to provide a unitary temperature control circuit for operation with both heating and cooling units to maintain the temperature of a particular enclosed space within a preselected range.

Temperature control circuits in accordance with the invention include a voltage divider network containing a temperature sensitive element located to respond to the actual temperature within the space to be heated or cooled and a temperature selecting potentiometer for preselecting the desired temperature. The voltage divider network is supplied by current from a regulated voltage source to insure that its operation is independent of any fluctuations in the line voltage. In this manner, output voltages from the voltage divider network vary in direct relationship with the actual temperature of the space and the preselected temperature. The invention embodies a silicon controlled network having a separate gate circuit operatively responsive to the output voltage of the voltage divider network. The controlled current in the anode circuit of the rectifier is utilized to control associated heating or cooling units to raise or lower the temperature. In accordance with one particular aspect of the invention, the heating effect of the current flowing in the gate circuit is applied by way of a thermal feedback arrangement to an element in the voltage divider network to reduce overshoot in the heating or cooling cycle and thus maintain a more even temperature around the preselected point.

Silicon controlled rectifiers are used in the various embodiments of this invention to provide relatively inexpensive but sufficiently sensitive electronic circuit elements. Their chief advantage lies in their ability to handle relatively large amounts of power compared to the small signal needed for their control. Furthermore, these devices not only may be used with unrectified alternating line voltage, but also they present distinct advantages when so used.

The present invention is readily adaptable for controlling either heating or cooling units and various specific embodiments of the invention are directed specifically to such uses. One particular arrangement in accordance with the invention is provided for controlling both heating and cooling units to achieve complete control of a space within a preselected temperature range. Certain of the particular arrangements of the invention are designed to control an associated heating or cooling unit on an "on-off" basis. Other particular arrangements incorporate particular circuitry in accordance with an aspect of the invention which shift the phase of the control voltage applied to the gating element so that substantially continuous control of an associated heating or cooling unit may be achieved between the "off" and full "on" conditions.

A better understanding of the invention may be had from a consideration of the following detailed description, taken in conjunction with the accompanying drawings, in which like reference numerals have been employed to designate similar elements, and in which.

Figure 6:
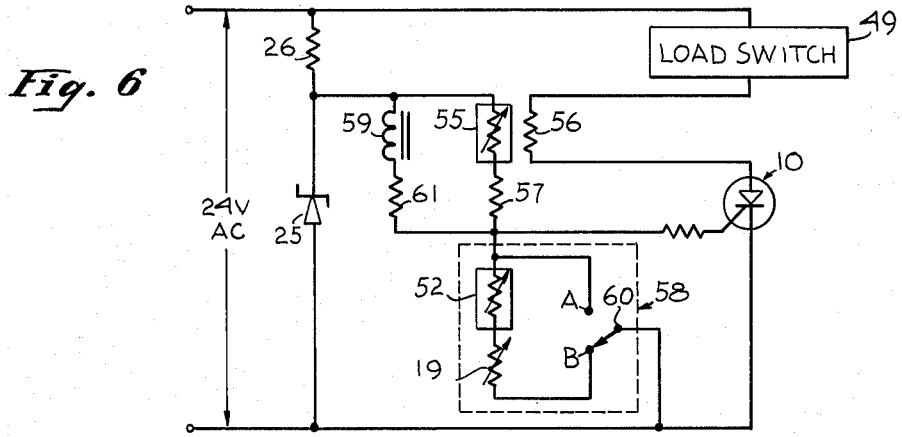
Figure 5:
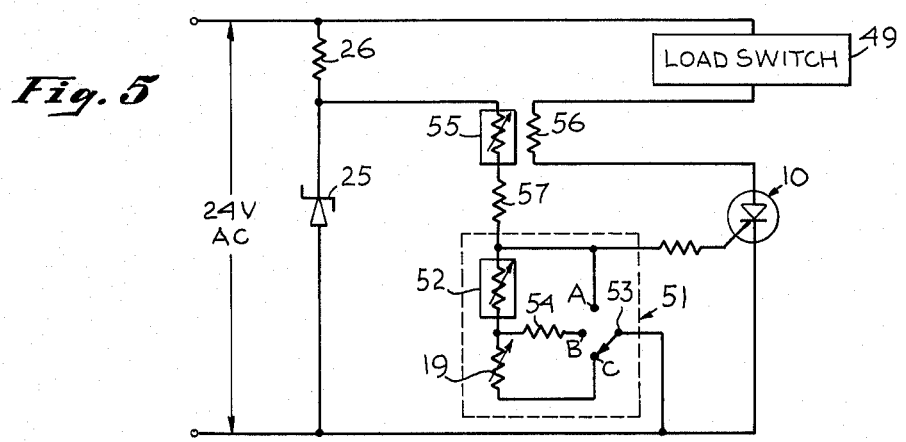
Figure 7:
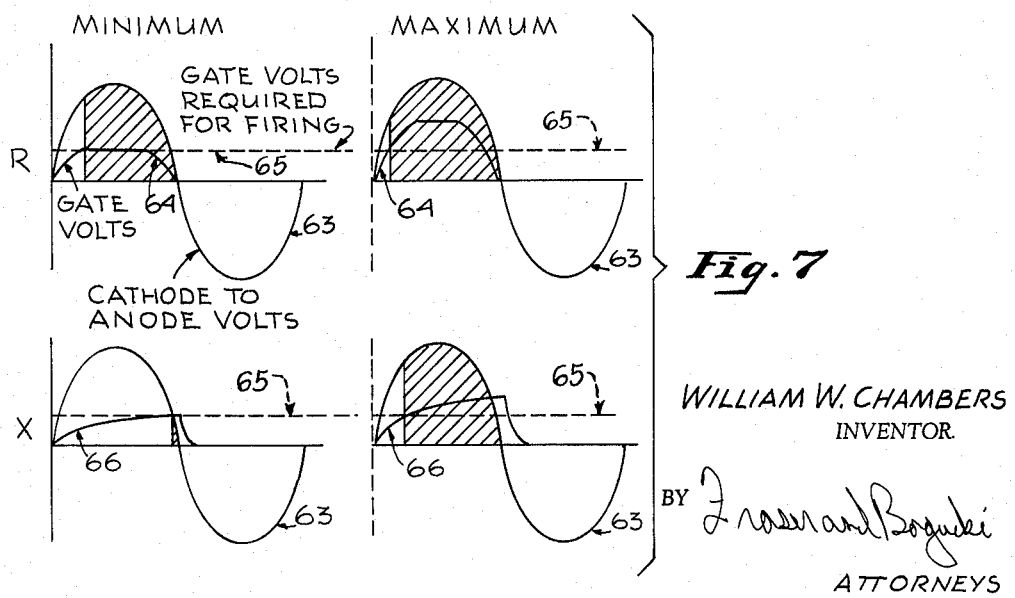
Figure 8:
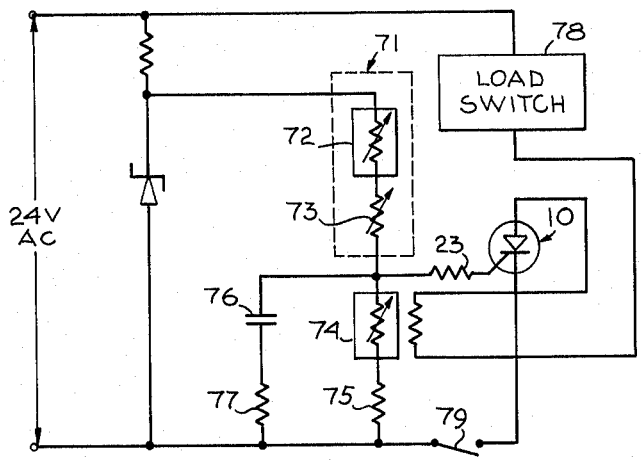
Figure 9:
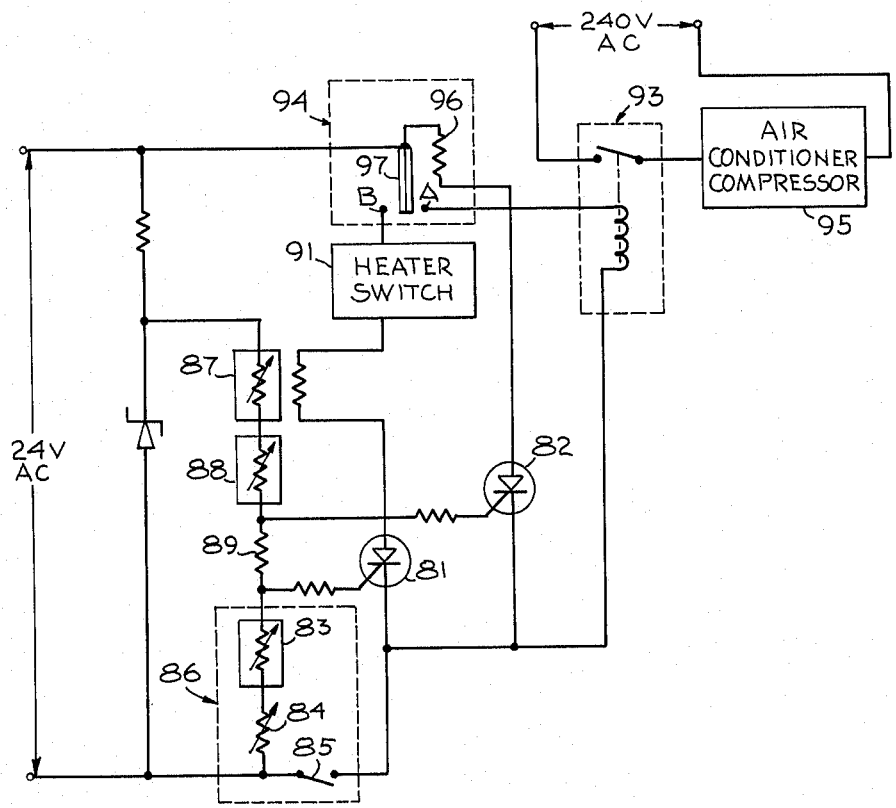

FIG. 5 schematically illustrates a modification of the invention useful in maintaining room temperature by means of thermostatic operation;

FIG. 6 is a block diagram of still a further embodiment of the invention providing thermostatic operation and additional circuitry for controlling the firing point of the silicon controlled rectifier;

FIG. 7 illustrates by means of wave diagrams the firing characteristics of the silicon controlled rectifier realized by the different circuit arrangements;

FIG. 8 is a schematic circuit diagram of yet another embodiment of the invention for controlling the firing point of the silicon controlled rectifier; and FIG. 9 is a schematic circuit diagram of a room temperature control circuit according to the invention which operates both a heating and a cooling unit to produce all weather temperature control.

Figure 1:
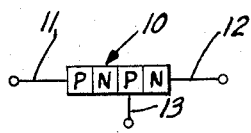
FIG. 1 is a diagrammatic illustration of a semiconductor gated rectifier, or silicon controlled rectifier, employed as a gating element in circuits of the present invention.
Figure 2:
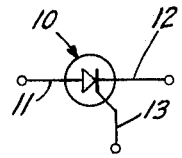
FIG. 2 illustrates the schematic symbol generally employed for the silicon controlled rectifier illustrated in FIG. 1.

This invention makes use of a recently developed gating element known in the art as a silicon controlled rectifier or gated silicon rectifier, illustrated in FIGS. 1 and 2, which comprises three P-N runctions, or four zones of P-N-P-N conductivities or vice versa. The silicon controlled rectifier 10 has an anode electrode 11, a cathode electrode 12, connected respectively to the ends of the silicon body, and a gate or control electrode 13 connected to the intermediate P or N zone. The corresponding schematic symbol for the silicon controlled rectifier is shown in FIG. 2.

The operating characteristics of silicon controlled rectifiers are such that the rectifier 10 may be rendered conductive by the application of a gating potential or of suitable polarity and amplitude applied to the gate electrode 13 at a time when the anode electrode 11 is positive with respect to the cathode 12. Conduction, once initiated, continues until the anode potential is reduced to approximately that of the cathode or is driven negative.

Figure 3:
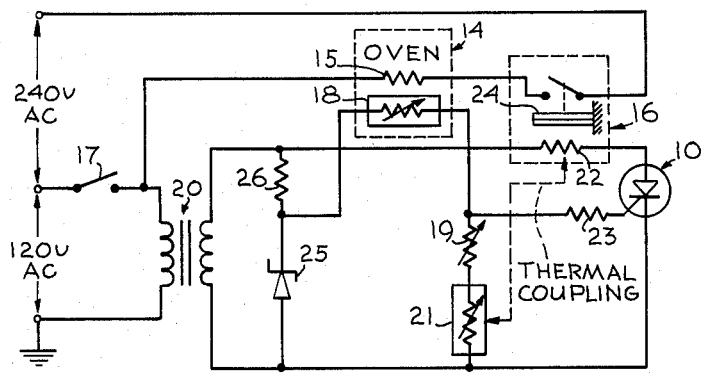
FIG. 3 is a schematic diagram representing one particular arrangement of the invention, showing a circuit for regulating the temperature of an electric oven.

Referring now to FIG. 3 (wherein the symbol shown in FIG. 2 is used to represent a silicon controlled rectifier), a temperature control circuit according to the invention is shown as arranged to selectively control the operation of an electric heating element 15 located within an oven space 14. A load circuit connects the heating element 15 via a switch 16 to receive alternating current from a supply line. The alternating current heating circuit is completed when the current operated switch 16 is closed by action of the temperature control circuit. The entire temperature control circuit, with the exception of a single sensing element, is located externally of the actual oven space.

The temperature control circuit comprises two interrelated circuits, the first being a sensing circuit for providing a measure of the oven temperature in relation to the preselected temperature, and the second being a control circuit including the silicon controlled rectifier 10 for actuating the current operated switch 16. These two circuits receive a stepped down voltage from a 120-volt line source of alternating current through a closed oven switch 17. The 120-volt line voltage is reduced through a step-down transformer 20 to approximately 24 volts, an acceptable level for the low power sensing and control circuits.

The temperature sensing circuit consists mainly of two temperature sensitive portions connected in a voltage divider network. The upper portion of the voltage divider network comprises a temperature sensor 18 located within the oven space 14 so as to be in contact with the region which is to be temperature controlled. The temperature sensor 18 is of a material having a high volume resistivity and a high positive temperature coefficient of resistivity, such as a thermistor or "Balco" wire or their equivalent, suitably designed and constructed for the intended use. It should be noted that this is the only element of the control circuit which is located within the oven space 14, and that it has no moving parts to be affected by heat, dirt, vapors or the like. If desired, it can be suitably covered or coated to resist the adverse effects of the high temperature and vapors encountered in the oven.

The second portion of the voltage divider network is a pair of resistance elements connected in series, one being a temperature adjusting potentiometer 19 and the other being a feedback thermistor 21. The feedback thermistor 21 (in contrast with the temperature sensor 18) has a negative temperature coefficient of resistance and is thermally coupled to a resistor 22 to provide a negative feedback function. The voltage divider network divides an applied voltage between its two portions in proportion to the resistance of the temperature sensor 18 as compared to the combined resistance of the potentiometer 19 and the feedback thermistor 21.

The current operated switch 16 of this circuit is a conventional heat actuated switch having a heat producing resistor 22 as an actuating element. The resistor 22 is series coupled with the cathode electrode of the silicon controlled rectifier 10 to receive the current passed from the secondary of the transformer 20 when the silicon controlled rectifier 10 conducts. The output voltage developed across the lower portion of the voltage divider circuit is used as the gating voltage for the silicon controlled rectifier 10. This gating voltage provides a gating current to the silicon controlled rectifier through a gate current limiting resistor 23, thus causing the rectifier 10 to conduct for positive half-cycles of voltage from the transformer 20. Current through the silicon controlled rectifier 10 also passes through the resistor 22 which heats an adjacent bimetallic tongue 24 causing it to deflect and close the movable contact arm of the switch 16 to which it is mechanically attached. Thus, when the silicon controlled rectifier 10 is fired (triggered to conduction by a suitable gating current) the contacts of the current operated switch 16 are closed to apply line voltage to the heating elements 15 of the oven 14.

If a constant voltage is applied across the voltage divider network, the voltage at the gate current tap on the voltage divider varies as a function of the ambient temperature within the oven. This is due to the change in resistance exhibited by the temperature sensor 18 in response to the increase in its ambient temperature. Therefore, for any particular setting of the potentiometer 19, the magnitude of the gate current delivered to the silicon controlled rectifier 10 becomes a function of the temperature within the oven. The magnitude of this gate current then determines whether current does or does not flow through the silicon controlled rectifier 10 to actuate the switch 16.

As an example of the operation, the oven switch 17 is closed to turn the oven on (assuming a cold start), immediately turning the silicon controlled rectifier 10 to its conductive state, thus closing the circuit to the oven heating element 15 through the switch 16. As oven temperature increases, the resistance of the temperature sensor 18 also increases, thereby reducing the gate voltage applied to the silicon controlled rectifier 10. Eventually the oven temperature reaches the level selected by the setting of the potentiometer 19, at which time the gating voltage is reduced to the point where the silicon controlled rectifier 10 is no longer conducting and the oven heater 15 is thus deenergized. Thereafter, the oven temperature is cycled over a range about the preselected temperature as the silicon controlled rectifier 10 is intermittently turned on and off. A decrease in oven temperature decreases the resistance of the temperature sensor 18, thus increasing the gate voltage until the silicon controlled rectifier 10 is enabled to conduct. The oven heating element 15 is then energized for a brief interval until the resulting increase in the resistance of the temperature sensor 18 reduces the gate voltage below the point at which the silicon controlled rectifier 10 conducts.

It should be remembered that the silicon controlled rectifier 10 conducts current only during the positive half-cycles of voltage from the transformer 20 and that the point in each positive half-cycle at which it is rendered conductive varies in accordance with the magnitude of the applied gate voltage. However, although the silicon controlled rectifier 10, when enabled by an appropriate gate voltage derived from the voltage divider network, conducts for only a portion of each cycle of alternating waveform, the thermal delay developed in the mechanism of the switch 16 serves to smooth the output of the silicon controlled rectifier 10 so that the oven heating element 15 is energized continuously when the gate voltage from the voltage divider network is above an appropriate level, whereas the heating element 15 is deenergized when the gate voltage is insufficient to fire the silicon controlled rectifier 10.

By varying the resistance of the temperature adjusting potentiometer 19, the temperature at which the silicon controlled rectifier conducts is varied. In order to increase the oven temperature, the temperature adjusting potentiometer 19 is increased in resistance, thus requiring that the temperature sensor 18 be heated to produce a higher resistance before reducing the applied gate voltage below the firing voltage of the silicon controlled rectifier 10.

Since fluctuations in anode voltage will have little effect on the firing characteristics of the silicon controlled rectifier, there is no need to regulate the anode voltage and its relatively high current. However, stabilization of the firing characteristics is of considerable importance in maintaining repetitive, consistent and accurate operation of the temperature control circuit. To a large extent these characteristics will depend upon maintaining the relation between gate current and oven temperature relatively constant, which in turn depends upon assuring that the voltage across the voltage divider circuit remains relatively stable. For most purposes, normal amplitude fluctuations in line voltage are sufficiently large as to cause erratic firing of the silicon controlled rectifier if used directly for the voltage divider circuit. Therefore, it is desirable to provide some means for regulating the voltage to the divider circuit. A preferred method of voltage regulation, as illustrated in FIG. 3, is accomplished by use of a Zener diode 25 in series with a dropping resistor 26 connected across the output voltage from the transformer 20. The Zener diode 25 breaks down and maintains a constant potential difference when a reverse voltage above a particular value is applied. The Zener diode 25 is selected to provide a relatively low breakdown voltage and thus is particularly desirable for providing voltage regulation at a level which is compatible with the control voltages derived from the step-down transformer 20 and applied to the silicon controlled rectifier 10.

Other methods of regulating the input voltage may be used, such as the neon lamp circuit illustrated in connection with FIG. 4, but the low breakdown voltage available with many Zener diodes allows the entire control system as shown in FIG. 3, for example, to be operated as a low voltage circuit. This lends itself to applications in which it may be desirable for reasons of cost, efficiency, or safety not to utilize the normal line voltages directly. A low voltage control circuit from a high voltage line supply can also be obtained by use of a semiconductor device (in place of the Zener diode) operating as a non-linear resistor. As voltage across such a device tends to increase, the resistance of the semiconductor tends to decrease so that the voltage or IR drop across the device remains relatively constant.

Since very small currents are required in the voltage divider network for satisfactory operation of the voltage divider circuit, the self heating of the thermo-responsive thermistors 18 and 21 can be made negligible by proper selection of the resistance values. This is of particular advantage with respect to the ability of the thermistor 18 to respond to the true temperature in the space being controlled. Additionally, the step-down in voltage from the transformer permits the use of a lower power, lower cost silicon controlled rectifier 10 to control the large current load to the heating element 15 through the intermediate switching mechanism 16.

The temperature regulating circuit embodies a heat anticipation effect which improves the accuracy with which the temperature is controlled. This advantageous result is achieved by thermally coupling the negative temperature coefficient thermistor 21 to the heating resistor 22 within the heat operated switch 16 as represented by the dashed line between the elements 21 and 22. The two are placed closely adjacent each other physically so that some of the heat from the resistor 22 is directed to the thermistor 21. As previously stated, current conduction through the silicon controlled rectifier 10 energizes the heating resistor 22 thus causing the bimetallic tongue 24 to close the contacts of the switch 16. By also coupling heat from the resistor 22 to the thermistor 21 the thermistor resistance is reduced. This in turn reduces the gate voltage available from the voltage divider circuit to the silicon controlled rectifier 10. The result is that the silicon controlled rectifier 10 shuts off sooner than it would without this thermal feedback, thus reducing the overshoot in temperature as the oven is heated. Conversely, when the silicon controlled rectifier 10 is not conducting, the thermistor 21 increases in resistance, thus cooperating with the sensing thermistor 18 to produce a finer control of the gate voltage. This thermal negative feedback effect counteracts the tendency of the oven to reach temperatures higher than the predetermined control temperature and minimizes the range within which the oven temperature fluctuates about the temperature setting.

Of particular utility as a heat responsive switch 16 is the bimetallic heat-operated switch known in the art as a rolling spring snap switch. Such a switch contains a bimetallic tongue with a resistance wire element either imbedded within the tongue itself between the two strips of metal or wrapped on the outside thereof. The switch snaps closed when the bimetal is heated and snaps open when the bimetal is cooled (or vice versa if so desired). Such bimetallic switches are by their nature ambient temperature sensitive; but, since the power supply to the heater through the silicon control rectifier 10 is either on or off, the point at which the switch snaps open on cooling may be adjusted to a temperature will above the anticipated maximum ambient level. Any ambient temperature effects are then reduced to negligible importance. Magnetic relays, hot wire relays or other similar switching means can be substituted for the bimetallic snap switch as long as a heating element is provided for thermal feedback via the thermistor 21.

Although the particular control circuit is illustrated and described herein as being used to control the operation of electrical heating or cooling elements, it should be understood that the control circuit can be easily modified for controlling heating or cooling units operated from other energy sources. For example, either the output from the load switch or the current flow to the silicon controlled rectifier can operate a solenoid controlled gas valve to regulate the flow of fuel to the oven burners or air conditioning equipment.

Figure 4:
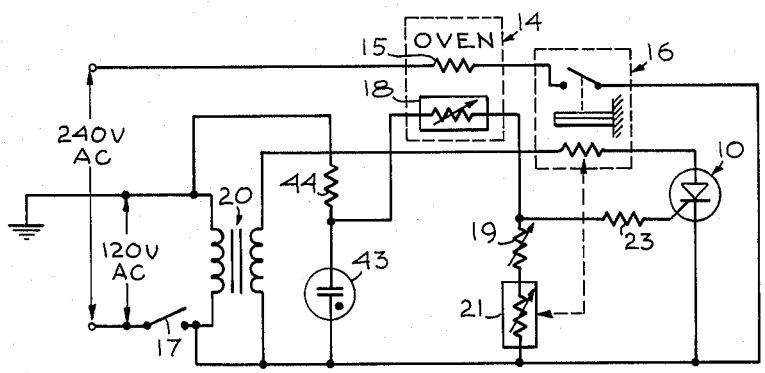
FIG. 4 is a schematic diagram of yet another arrangement of the invention employing a distinct method of regulating the gating voltage of the control circuit of FIG. 3.

In FIG. 4, the voltage across the voltage divider circuit is regulated by using a neon lamp 43 connected as shown. Because of the higher regulation level of a neon lamp, the direct line voltage is applied to the neon lamp 43 and its voltage dropping resistor 44 in the voltage regulation circuit, while the silicon controlled rectifier 10 is driven at the lower voltage of the transformer 20. Furthermore, the temperature sensing thermistor 18 is arranged to have sufficient resistance compared to the other portion of the voltage divider circuit to drop the gating voltage to a level giving a safe gate current. In other respects, the control circuit of FIG. 4 remains the same as that shown in FIG. 3. The use of a neon lamp provides the advantage that it may be used as a visual indicator that the oven control circuit is energized.

In each of the modifications disclosed heretofore, a distinct advantage should be noted, as the temperature adjustment potentiometer 19 has its resistance increased to increase the control temperature within the oven 14, the effect of the feedback thermistor 21 becomes less, thus reducing the anticipation effect and increasing oven temperature differential. This effect is to be desired when the oven space 14 is used in the cooking of foods since it provides the advantage of a low temperature differential at the lower oven temperature where food is adversely affected by wide fluctuations in the cooking temperature. On the other hand, it also provides an increasing differential with higher cooking temperatures, which, according to many authorities on oven cooking is to be desired because of the better food product which results.

Generally, a still further advantage is obtained from the feedback thermistor 21 in that, by locating it in the same ambient temperature as the silicon controlled rectifier 10, it compensates partially for the characteristic effects of ambient temperature on the firing voltage of the silicon controlled rectifier 10. Depending upon the sensitivity requirements of the control circuit, additional ambient temperature compensations may be introduced by those skilled in the art if desirable.

It should be understood that the position of the portion of the voltage divider circuit containing the temperature sensor 18 and that portion including the temperature adjustment potentiometer 19 and the feedback thermistor 21 may be reversed is desired. If reversed, the silicon controlled rectifier 10 is nonconductive as the oven is heated, and is fired to deenergize the oven heating units. The resulting effect produced by the feedback thermistor 21 in this case would decrease oven temperature differential as oven temperature increases.

FIGS. 5, 6 and 8 depict other temperature control circuits in accordance with the invention which are shown more generally for use with either gas or electric heating or cooling units. The element which is energized by the silicon controlled rectifier 10 is represented generally as a load switch 49 and, although the heat producing resistor 56 is illustrated as a separate element, it should be understood that it normally forms an integral part of the load switch 49, as shown in the embodiments of FIGS. 3 and 4. The circuits will be described as related to room heating or cooling units, but the respective features are also applicable to oven heating units as well.

The room temperature control circuit of FIG. 5 is provided with a thermostat arrangement 51 that can be conveniently located within the desired room space. The thermostat arrangement 51 is shown containing a three position switch 53 provided either for choosing one of two modes of operation or for turning the control circuit off. In the A position, the switch 53 connects the gate electrode circuit directly to the collector of the silicon controlled rectifier 10, thereby preventing any gate current from flowing and thus maintaining the temperature control circuit in the "off" position. In the B position, the switch 53 connects the gate electrode circuit of the silicon controlled rectifier 10 through a fixed resistance 54 to place it in series with a temperature sensing thermistor 52. The resistance value of the fixed resistor 54 is so chosen as to provide operation of the control circuit at a preselected normal temperature which will usually provide comfort within the room. Should this preselected temperature be uncomfortable for some reason, the movable tap of the three position switch 53 can be moved to the final position C to connect the temperature control potentiometer 19 in series circuit with the temperature sensing thermistor 52, thus allowing a more comfortable temperature to be selected at will.

It should be noted that the temperature sensing thermistor 52 is connected in the lower portion of the voltage divider circuit and has a negative temperature coefficient. Though this arrangement is opposite to that of the previously described embodiments, the effect thereof can be seen to be similar. As the temperature within the room increases, the resistance value of the temperature sensing thermistor 51 decreases to lower the value of the gate current, thereby extinguishing the current flow through the silicon controlled rectifier 10. The load switch 49 can then be made to open if it controls a heater or to close if it is controlling a cooling unit.

Negative thermal feedback in the control circuit is accomplished through a feedback thermistor 55 which in this case is connected in the top portion of the voltage divider network and has a positive temperature coefficient of resistance. The feedback thermistor 55 is thermally coupled to a heat producing resistor 56 in the output circuit of the silicon controlled rectifier 10. In operation, the passage of current through the heat producing resistor 56 heats the feedback thermistor 55 to raise the resistance thereof and lower the gate voltage applied to the gate electrode of the silicon controlled rectifier 10. An additional fixed resistor 57 may be included in series with the feedback thermistor 55 if necessary to raise the total resistance of this portion of the voltage divider circuit.

In FIG. 6, the thermostat arrangement 58 contains only a two position thermostatic switch 60. The A position short-circuits the gating electrode to prevent the silicon controlled rectifier 10 from firing and thus constitutes the "off" position. The B or "on" position of the two position switch 60 connects the temperature adjusting potentiometer 19 and the temperature sensitive thermistor 52 in series to produce the operation of the temperature control circuit as already described.

The remaining elements of the temperature control circuit of FIG. 6 are essentially identical to those described in FIG. 5 and the operation thereof is substantially the same except for one important difference. A phase shifting network consisting of an inductor 59 connected in series with a resistor 61 is connected in parallel across the upper portion of the voltage divider. Reference will be made to the waveforms of FIG. 7 in order to adequately explain the effect of this phase shifting network upon the firing characteristics of the silicon controlled rectifier 10.

In FIG. 7, idealized waveforms R and X illustrate the firing characteristics of the silicon controlled rectifier 10, both with and without the phase shifting circuit. In both cases the conditions for minimum and maximum firing have been shown.

Waveform R illustrates the situation in which the output load, the gating circuit and the voltage divider all consist of purely resistive elements; that is, the gating current is in phase with the voltage applied across the anode and cathode of the silicon controlled rectifier 10. The curve 63 represents a full cycle of sine wave voltage applied across the output terminals of the silicon controlled rectifier. Since all the elements are resistive, the gate voltage curve 64 builds up in sine wave fashion until it equals the breakdown voltage of the Zener diode 25, at which point further increase is prevented by the voltage regulating effect of the Zener diode 25. This gate voltage maximum will be maintained during a portion of the remainder of the cycle at this constant level. Also indicated on each of the waveform diagrams is an idealized plot 65 of the gate volts required to fire the silicon controlled rectifier during the positive polarity part of the cycle. This plot 65 shows the required gating voltage as esesntially a constant threshold level which is virtually independent of variation in anode voltage, the only requirement being that the anode be positive with respect to the cathode.

The minimum firing position is obtained when the gate voltage maximum from the voltage divider circuit is barely sufficient to satisfy the minimum firing condition of the silicon controlled rectifier. In waveform R, this firing will occur at or preceding the middle of the positive half of the cycle, depending on how much of the top of the waveform is chopped by the Zener diode. If chopping is negligible, firing will occur at or near the middle of the positive half cycle whereas if chopping is extensive, firing will occur early in the positive half cycle. In either case, the applied gating voltage is essentially the minimum for firing. The shaded portion of the waveform illustrates that portion of the cycle during which the silicon controlled rectifier remains conductive after firing.

At the maximum firing condition the gate voltage required for firing remains the same, but the voltage from the voltage divider circuit is substantially increased as shown by the increased height of the waveform 64. The gate voltage curve 64 thus crosses the plot 65 much earlier during the positive polarity portion of the cycle to extend the period of conduction to almost a full half cycle. Waveform R thus illustrates the fact that with the in-phase relationship, the firing point will move from the peak of the chopped sine wave toward the start of the positive polarity of the wave as the applied gate voltage increases, thus limiting the maximum-to-minimum power ratio to less than two to one.

The curve 66 of the waveform X illustrates the modified form of the gate voltage due to the effect of the RL network 59, 61 connected across the portion of the voltage divider. The inductive reactance changes both the phase and the shape of the gate voltage curve from that illustrated in waveform R. The gate voltage curve 66 in this case rises relatively sharply at the beginning of the positive half cycle and then continues a more gradual rise which does not reach a maximum until about the end of the positive half cycle. At the maximum output level, the curve 66 crosses the curve 65 early in the cycle to produce almost full half wave firing. With minimum firing, the two curves cross only during the very last portion of the positive part of the cycle. Therefore by modifying the gate voltage curve both in phase and in shape, the firing of the silicon controlled rectifier 10 at the minimum condition can be reduced significantly from the minimum which is possible with the R waveform.

The load supplied by the silicon controlled rectifier 10 may be a device which is insensitive to the amount of output current and thus operates to produce an "on-off" operation. On the other hand, the load switch 49 may be constructed to respond on an analog basis to a variable output from the silicon controlled rectifier 10 in order to regulate the amount of heating or cooling according to the deviation of the temperature from the desired control point. For example, a modulated gas heating valve may be used in this connection to gradually reduce the rate of gas flow to the heating elements of the burner as the room air temperature approaches the desired temperature. By introducing a phase shift, as described, the output of the silicon controlled rectifier 10 can be used to regulate the burner output automatically over the wider range from near zero output to almost full half wave.

FIG. 8 shows an additional embodiment of the invention in which the temperature sensing element is located in the upper portion of the voltage divider network. In this case, the temperature sensing thermistor 72 has a positive temperature coefficient and is connected in series with the temperature adjusting potentiometer 73. The lower portion of the voltage divider network now contains the feedback thermistor 74, which has a negative temperature coefficient, and the voltage dropping resistor 75. The phase shifting and shaping of the gate voltage is accomplished in the circuit of FIG. 8 by connecting an RC circuit having a capacitor 76 and a resistor 77 in parallel with the lower portion of the voltage divider network.

This arrangement can be seen to have a similar effect to the RL network of FIG. 6.

In the operation of the circuit of FIG. 8, an increase in temperature increases the resistance of the thermistor 72, thus lowering the gate voltage and reducing conduction in the silicon controlled rectifier 10. A decrease in temperature conversely decreases the resistance of the thermistor 72 to make the silicon controlled rectifier 10 conduct more current. The load switch 78, as before, may be designed to operate on an analog basis to vary the amount of heat produced by an associated system in response to variations of current through the silicon controlled rectifier 10. An "on-off" switch 79 is provided in series with the silicon controlled rectifier 10, and can be opened to disable the entire temperature control circuit when the associated system is not in use.

Referring now to FIG. 9, a similar temperature control circuit employing two silicon controlled rectifiers 81 and 82 is shown interconnected with both an air conditioner and a heater switch to produce both heating and cooling control of the temperature for all year or all weather operation. The lower portion of the voltage divider network contains a room temperature sensing thermistor 83 having a negative temperature coefficient, a temperature adjusting potentiometer 84 and an on-off switch 85, all within the thermostat enclosure 86. A feedback thermistor 87 and an outdoor temperature compensating thermistor 88, both having positive temperature coefficients of resistance, are connected in series to form the upper half of the voltage divider network. The two halves of the voltage divider network are separated by a changeover differential resistor 89 and the gating circuits of the two silicon controlled rectifiers 81 and 82 are connected on the opposite ends thereof. By this arrangement, the silicon controlled rectifier 81 always receives a slightly lower gating voltage than the silicon controlled rectifier 82. There is thus an intermediate range of temperatures in which the silicon controlled rectifier 81 controlling the heater switch 91 is not supplied with sufficient gate voltage to fire even though the silicon controlled rectifier 82 controlling the air conditioner actuating circuit is receiving sufficient gate voltage to conduct. It will be noted that the silicon controlled rectifier 82 acts to deenergize the air conditioner circuit when it conducts. The resistor 89 thus prevents undesirable cycling or hunting between the heating and cooling systems, and the ohmic value of the resistor 89 determines the extent of this intermediate range in degrees of temperature.

The system shown in FIG. 9 operates to control the operation of a cooling system relay 93 through an interlock switch 94. The cooling system relay 93 when energized via the normally closed A contact of the switch 94 closes the power circuit to the air conditioning compressor 95. Until such time as the silicon controlled rectifier 82 fires in response to an increase in the gate voltage, the air conditioning system continues to cool the room. Such an increase in the gate voltage is caused by the increase in resistance of the temperature sensing thermistor 83 in response to a decrease in temperature. When the silicon controlled rectifier 82 conducts, the movable contact 97 of the interlock switch 94 is thrown to the normally open B contact to deenergize the air conditioner and to complete the circuit to the silicon controlled rectifier 81.

This interlock switch 94 may be a heat operated snap switch (as shown, with a heating element 96 and a bimetallic element 97), or a magnetic relay, or any other similar means for effecting the changeover from the cooling to the heating operation in response to current from the silicon controlled rectifier 82. After the changeover, the silicon controlled rectifier 82 is still connected in the circuit and will continue to conduct during positive half cycles of applied voltage, thereby holding the interlock switch closed on the B contact. Due to the previously described action of the changeover differential resistor 89, the silicon controlled rectifier 81 will not commence to fire immediately upon changeover. The heater switch 91 is only actuated after the temperature drops to the lower limit of the changeover range at which point the silicon controlled rectifier 81 fires. The sequence of events is reversed when changing from a heating to a cooling operation.

The outdoor temperature compensating thermistor 88 operates to alter automatically the room temperature in response to changes in outdoor temperature to provide maximum comfort and reduce the necessity of changing the thermostatic settings as the weather changes outdoors. As outdoor temperature decreases, the resistance of the upper half of the voltage divider circuit decreases because of a reduction in the resistance of the thermistor 88, thereby firing the silicon controlled rectifiers 81 and 82 at higher room temperatures than normal. During hot summer periods the air conditioner compressor 95 is thus operative at lower room temperatures than normal, while in extreme cold weather the point of actuation of the associated heating system, controlled by the heater switch 91, is raised slightly.

Although there have been described above various specific temperature control arrangements in accordance with the invention for the purpose of illustrating the manner in which the invention may be used to advantage, it will be appreciated that the invention is not limited thereto. Accordingly, any and all modifications, variations or equivalent arrangements falling within the scope of the annexed claim should be considered to be a part of the invention.

What is claimed is:

A temperature control circuit for controlling apparatus to establish a selected temperature within a space comprising: a regulated source of alternating voltage; a voltage divider network coupled to said source and including first and second temperature sensitive elements and an adjustable resistor; a silicon controlled rectifier having an input electrode coupled to receive a gating voltage from an intermediate point in said voltage divider network, said first temperature sensitive element being thermally coupled to sense the temperature of the space being controlled in order to vary the gating voltage in accordance therewith; a heat actuated load switch including a heating element responsive to current flow through said silicon controlled rectifier to actuate said load switch, said heating element being thermally coupled to apply heat to the second temperature sensitive element in response to said current flow so as to reduce the variation of temperature in the space being controlled, said heating element and said second temperature sensitive element operating independently of the temperature within the space.

References Cited by the Examiner

UNITED STATES PATENTS

| | | | |
|---|---|---|---|
| 2,257,540 | 9/1941 | Smellie | 165—27 X |
| 2,292,975 | 8/1942 | Spangenberg | 236—68 |
| 3,050,611 | 8/1962 | Kamide. | |
| 3,051,813 | 8/1962 | Busch et al. | |
| 3,051,815 | 8/1962 | Hukee et al. | |
| 3,062,941 | 11/1962 | White | 236—68 |
| 3,062,942 | 11/1962 | Finlay et al. | |
| 3,071,676 | 1/1963 | Van Sandwyk. | |
| 3,097,314 | 7/1963 | Harriman. | |
| 3,122,199 | 2/1964 | Byloff | 165—2 |

OTHER REFERENCES

Publication: Silicon Controlled Rectifier Manual (2nd ed.) copyright 1961, General Electric Co.

JAMES W. WESTHAVER, *Primary Examiner.*